June 19, 1951 E. BLETZ 2,557,810

THERMOSTATIC SWITCH

Filed Jan. 18, 1949

INVENTOR.
Edward Bletz
BY
Woodling and Krost,
attys

Patented June 19, 1951

2,557,810

UNITED STATES PATENT OFFICE 2,557,810

THERMOSTATIC SWITCH

Edward Bletz, Mansfield, Ohio, assignor to Stevens Manufacturing Company, Inc., a corporation of Ohio Application January 18, 1949, Serial No. 71,501

2 Claims. (Cl. 200—139)

The invention relates in general to thermostats and more particularly to the provision of a positive off position on a thermostat.

This application is a continuation-in-part of the application Serial No. 778,552, filed October 8, 1947, now Patent No. 2,518,595, granted August 15, 1950, entitled "Positive 'Off' Thermostatic Switch."

When a thermostat is used to control the operating temperature of a thermostatically operable device over a given operating temperature range which is considerably removed from the normal room temperature or normal temperature of the surroundings of the thermostatically operable device, and the thermostat incorporates an off position of the electrical contacts of the thermostat, considerable difficulty is encountered in attempting to eliminate the waste distance between the setting for the normal room temperature and the setting for the lowest operating temperature of the given operating temperature range. Thus, for example, in the case of an electric flatiron the useful operating range of the iron is considerably above normal room temperature, and when an adjusting device provides this given operating temperature range, this manual adjustment also must be constructed to provide sufficient movement to include the useless range or waste distance between the setting for the lowest operating temperature and the setting for normal or room temperature.

My invention relates to methods to eliminate as much as possible waste space between the off condition and one limit of the given operating temperature range of the thermostat.

Another object of my invention is to provide a positive off position in a strip type thermostat wherein the off position is immediately adjacent the operating range of the thermostat.

Another object of my invention is the provision of restraining means in a thermostat such that no relative movement between the contact points occurs below a given temperature.

Another object of my invention is the provision in a thermostat of means for deflecting the contact means to a given position wherein the bimetallic means of the thermostat is rendered ineffective to move the contact means until subjected to temperatures above a given point.

Another object of my invention is the provision of a thermostat having two contact means and bimetallic means for varying the spacing therebetween and means for spacing the contact means apart to a degree equal to the spacing that would otherwise have been provided by the bimetallic means in deflecting from a first to a second temperature.

An object of my invention is to provide a mechanical deflecting member to deflect a first contact strip of a thermostat to a position at one end of the operating range of the thermostatically operated device such that a manually adjustable second contact strip need only be positioned just out of contact with said first contact strip in order to obtain an off condition of said thermostat for all temperatures out of said operating range beyond said one end thereof.

A further object of the invention is to provide a strip type thermostat having an end of each strip clamped in a stack and wherein a substantially rigid deflecting strip has one end clamped in the stack and another part of the rigid strip causing deflection of the bimetallic strip of the thermostat, such deflection to be in the same direction as the deflection of the bimetallic strip in moving toward the operating range from its normal position at room temperature.

A still further object of the invention is to provide a strip type thermostat having a deflecting strip for providing an off position of the thermostat which is closely adjacent one limit of the operating temperature range and wherein the thermostat is a complete unit furnishing such positive off condition without depending on mechanical cooperation with any part of the electrical appliance with which the thermostat may be used.

Other objects and a fuller understanding of my invention may be had by referring to the following description and claims, taken in conjunction with the accompanying drawings, in which:

Figures 1, 2:
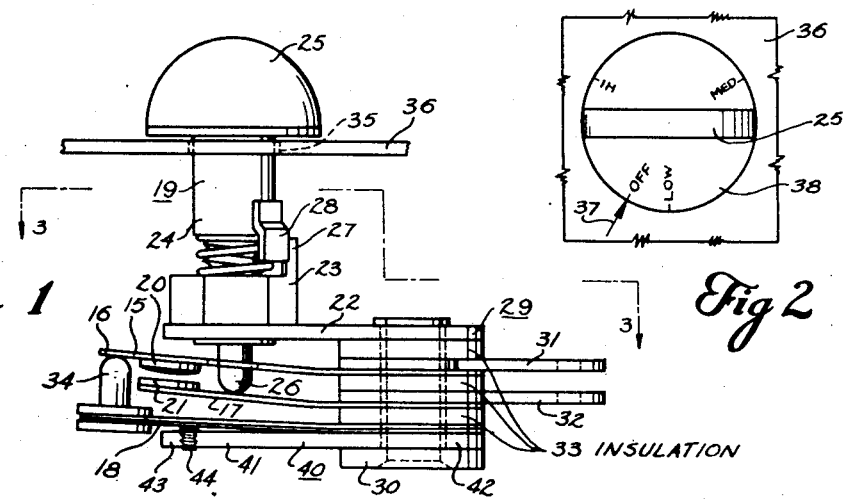
Figure 1 is an elevational view of a strip type thermostat which incorporates the preferred embodiment of my invention.
Figure 2 is a top plan view of the manually adjustable knob for determining the operating point of the thermostat and corresponding to Figure 1 to show the thermostat in an off condition.

The invention will be shown as being applied to a strip type thermostat, although it will be apparent that my invention may be incorporated into thermostats of any type having at least one flexible member, and wherein a strip of material may be firmly clamped against such one flexible member to deflect or stress this member from its normal unstressed position.

The thermostat, as best shown in Figures 1 to 5, includes generally a first flexible contact strip 16, a second flexible contact strip 17, a flexible bimetallic strip 18 and a manual adjusting means 19. The first flexible contact strip 16 may be stated as having an operative portion 15 which is movable and is capable of performing the required function of the thermostat proper. In the thermostats shown and described in this application, this operative portion 15 will be described as including a first electrical contact 20 adapted to cooperate with a second electrical contact 21 carried by the second flexible contact strip 17. The manual adjusting means 19 includes a rigid support member 22, a threaded nut 23 fixedly carried by the rigid supporting member 22, a threaded shaft 24 threadable in the threaded nut 23, a knob 25 fixedly fastened to the threaded shaft 24 for rotation thereof, and an insulating tip 26 carried by the lower end of the threaded shaft 24 for bearing against the second flexible contact strip 17. The threaded nut 23 has a projection 27 to engage a shaft projection 28 extending laterally from the side of the threaded shaft 24. The projections 27 and 28 are to limit the travel of movement of the threaded shaft 24 to an angular rotation of less than 360 degrees merely as a matter of convenience in calibration.

One end of each of the flexible bimetallic strip 18, the flexible contact strips 16 and 17, and the rigid support member 22, are securely fastened in a stack 29 by a hollow rivet 30 to securely fasten these parts of the thermostat together. First and second terminals 31 and 32 are provided in the stack 29 in electrical contact with the first and second flexible contact strips 16 and 17. Insulation washers 33 are provided in the stack 29 to insulate each of the flexible contact strips 16 and 17 from all other metal parts of the thermostat. A second insulating tip 34 is carried by the free end of the flexible bimetallic strip 18 so that this flexible bimetallic strip 18 may positionally move the first flexible contact strip 16 without electrical contact therewith.

The threaded shaft 24 is shown as extending through a hole 35 in an indicator plate 36, which indicator plate 36 carries an arrow 37 for indicating the position of the knob 25, and hence the operating condition of the thermostat. The knob 25 has a flange 38 on the periphery of which are marked an off position and a low, medium and a high position for cooperating with the arrow 37 to indicate the temperature setting of the thermostat.

In this preferred embodiment of Figures 1 through 5, deflecting means 40 are provided for deflecting the bimetallic strip 18 from its normal or unstressed position. This deflecting means 40 is shown as a rigid deflecting member 41 having a first end 42 clamped in the stack 29 and having a second end 43 generally extending alongside the bimetallic strip 18. The first end 42 of the deflecting member 41 is in intimate contact with the bimetallic strip 18 in the stack 29. The second end 43 of the deflecting member 41 carries an adjustable device shown as a threaded set screw 44. This set screw 44 may be adjusted by any well known means, such as a screw driver, to bear against the under side of the bimetallic strip 18 to deflect same upwardly as shown in the Figures 1 and 4 of the drawing. The bimetallic strip 18 has a natural tendency to extend out substantially horizontally when under normal temperature conditions such as room temperature. The first flexible contact strip 16 has a natural resilient tendency to deflect downwardly, and hence bears against the second insulating tip 34. The second flexible contact strip 17 has a natural resilient tendency to deflect upwardly and hence bears against the first insulating tip 26. This thermostat, when used for a temperature range which is higher than room temperature is assembled so that the flexible bimetallic strip 18 is adapted to deflect upwardly upon rising temperatures. The deflecting member 41 deflects the flexible bimetallic strip 18, and consequently the first flexible contact strip 16 to a position that such contact strip would normally occupy at one limit of the given operating temperature range of the thermostat. By so deflecting the flexible bimetallic strip 18 upwardly to a point at the lower limit of the operating temperature range, the flexible bimetallic strip is externally stressed. As the temperature to which the thermostat is subjected rises, such external stress of the flexible bimetallic strip will be relieved increasingly as the internal stress caused by the rising temperature increases. When the temperature reaches the lower limit of the given operating temperature range, the internal stress caused by the temperature rise will have increased to a point where it equals the external stress applied by the deflecting member 41. Upwards of this temperature, the flexible bimetallic strip 18 will begin to deflect upwardly, since the internal stress will then be greater than the external stress formerly applied by the rigid deflecting member 41. By so deflecting the flexible bimetallic strip 18 and consequently the first flexible contact strip 16, this provides that there is no mechanical deflection and consequently no relative movement between the first and second contacts 20 and 21 for any and all temperature changes below the lower limit of the given operating temperature range.

Figure 3:
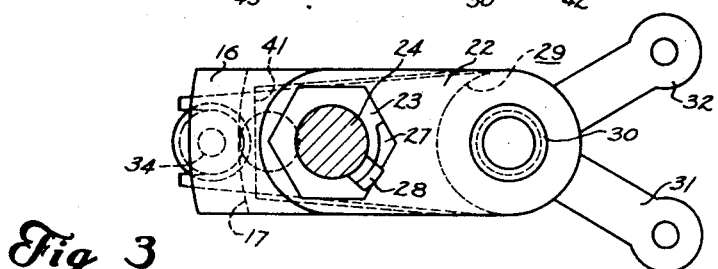
Figure 3 is a sectional plan view taken along the line 3—3 of Figure 1.
Figures 4, 5:
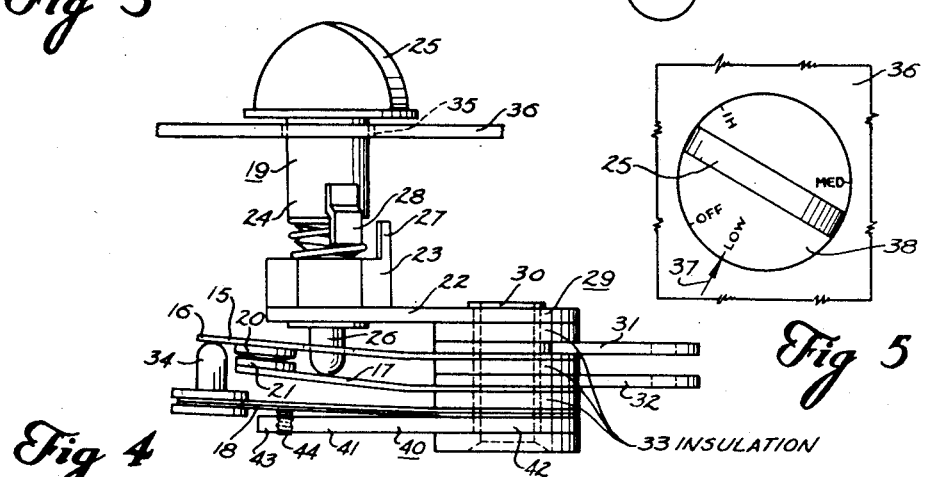
Figure 4 is an elevational side view of the thermostat of Figure 1 with the manually adjustable knob moved to the low or initial on position of the thermostat.
Figure 5 shows a top plan view of the manually adjustable knob and which corresponds to Figure 4.

In operation, the thermostat is manually adjustable through a given operating temperature range as defined by the limits, low and high, on the knob 25 and is also adjustable to an off position whereat the contacts 20 and 21 are incapable of electrically contacting each other regardless of how low the temperature of the thermostat may become. The Figures 1, 2 and 3 show the thermostat in the off condition, and the Figures 4 and 5 show the thermostat in the low position, which also may be considered as the initial on position of the thermostat. When the thermostat is in the off position, the rigid deflecting member 41 deflects the bimetallic strip 18, and hence the contact strip 16 to such an extent that the contacts 20 and 21 are not in mutual contact. When the knob 25 is turned to the low position, the insulating tip 26 is raised sufficiently to permit the second contact 21 to be in electrical contact with the first contact 20, as shown in the Figure 4. Assuming that the thermostat is connected to control the heat of a thermostatically controllable device, the electrical contacting of the first and second contacts will provide heat to this thermostatically controlled device, which heat will cause the flexible bimetallic strip 18 to deflect upwardly until the second insulating tip 34 moves the first flexible contact strip 16 to break the electrical contact between the first and second contacts 20 and 21. This will cause the device and the flexible bimetallic strip 18 to cool and deflect downwardly to reclose the first and second contacts 20 and 21. Reclosing of the contacts causes the flexible bimetallic strip 18 to again heat up to again open the contacts 20 and 21. This alternate heating and cooling, with consequent making and breaking of the contacts 20 and 21, may be termed the regulating range of the thermostat, which temperature variations will be in the order of a few degrees, and is affected by the thermal activity of the particular bimetal used.

If the knob 25 is moved to any higher position within the given operating temperature range between the low and the high position, the flexible bimetallic strip 18 will deflect upwardly until it again causes the opening of the first and second contacts 20 and 21, and thus the regulating cycle of alternate making and breaking of the contacts 20 and 21 will occur to maintain, within the regulating range, the temperature indicated by the knob 25 and arrow 37. If the knob 25 is turned to the "off" position, the second flexible contact strip 17 will be deflected downwardly by the insulating tip 26 to the position shown in Figure 1, although the flexible bimetallic strip 18 will still be hot, and will be deflected upwardly above that position shown in Figure 1, and the second insulating tip 34 will be in contact with the first flexible contact strip 16 to deflect it upwardly as well. As the flexible bimetallic strip 18 cools and deflects downwardly, the first flexible contact strip 16 will also follow along with this flexible bimetallic strip 18, urged by its own resiliency, until it reaches the position shown in the Figure 1, wherein the bimetallic strip 18 and hence the first flexible contact strip 16 will be held stationarily deflected by the rigid deflecting member 41 for all temperatures of the flexible bimetallic strip 18 below that lowest operating temperature as shown on the knob 25.

In thermostats constructed in a normal fashion, those not in accordance with the present invention, to provide an "off" condition, the manual adjusting means must cause the second flexible contact strip to be depressed downward sufficiently so that even at room temperatures or slightly below, the contacts 20 and 21 would not reclose. However, if the temperature to which the bimetallic strip was subjected were to be lowered sufficiently below room temperature, the contacts would always reclose, since the bimetallic strip would continuously deflect downward below the horizontal. In the absence of the rigid deflecting member, the first flexible contact strip is positionable only by the flexible bimetallic strip, whereas in my invention, the first flexible contact strip is deflected upwardly by the rigid deflecting member 41 to a position approximately at the beginning of the given operating temperature range of the thermostatically operated device. For instance, if a flatiron has a given operating temperature range of from 200 degrees to 400 degrees Fahrenheit, then in the form of thermostat without the rigid deflecting member 41, the second flexible contact strip 17 would have to be constrainingly urged downward by the manual adjusting means 19 to a position such that the contacts 20 and 21 would not reclose until the room temperature was at least down to about 50 degrees Fahrenheit. This means that there would be a 150 degree change of temperature from the "off" position to the lowest operating temperature in the given operating temperature range, with only 200 degrees in the actual operating range. Assuming that the calibration of the bimetallic strip is substantially linear, then ¾ of the dial calibration would be wasted, as merely representing that space between the "off" position, or 50 degrees Fahrenheit and 200 degrees, or the low position of the given operating temperature range.

Now in my invention the rigid deflecting member 41 holds the bimetallic strip 18, and hence the first flexible contact strip 16 deflected upwardly to approximately that position that it would normally occupy at the lowest temperature of the given operating temperature range. Therefore, to obtain the "off" position in my thermostat, the second flexible contact strip 17 need only be constrainedly urged downward by the manual adjusting means 19 until sufficient separation between the contacts 20 and 21 is obtained to prevent any arcing at the voltages used. For the above-mentioned example of a 200 degree Fahrenheit temperature as the lowest temperature in the given operating temperature range, a sufficient separation of the contacts 20 and 21 would be obtained merely by deflecting the second flexible contact strip downwardly to a position that would normally produce a regulating temperature in the thermostat of approximately 180 or 190 degrees Fahrenheit. As shown in the Figures 2 and 5, the "off" position and the low position are very closely adjacent, being only approximately 30 degrees apart in the rotational movement of the manual adjusting means 19. The manual adjusting means 19, as I have illustrated in the Figures 2 and 5, shows approximately a 300 degree rotational movement of the calibrated knob 25. This 30 degree movement between the "off" position and the low or initial "on" position is only about $\frac{1}{10}$ of the dial calibration that is used for obtaining the "off" condition of a thermostat, and $9/10$ of the dial calibration is therefore able to be utilized for the calibration of the given operating temperature range. With a considerably smaller amount of the dial space wasted by the distance between the "off" and the initial "on" position, and the usable operating range greatly increased, the bimetallic member of the thermostat may be chosen as one having a much greater thermal activity, or degree of deflection for a given temperature change. This much more active bimetal has greater advantages in obtaining a more closely controlled temperature for two reasons. The first reason is that the dial calibration in being spread out over a greater physical distance is capable of being more finely and accurately calibrated and more easily determinable as to the exact temperature selected. The second reason is that the slight temperature differences within the actual regulating range in the thermostat by the opening and closing of the contacts, which are caused by the heating and cooling of the bimetal, are less widely separated. This means that the temperature variations caused by the regulating effect of the thermostat at a given temperature setting are caused to vary less than in the ordinary form of thermostat with the absence of the rigid deflecting member 41.

Figure 6:
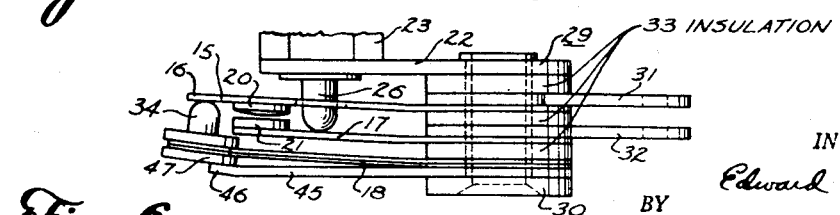
Figure 6 is a fragmentary side elevational view of a modified form of the invention.

The Figure 6 shows a further modification of the invention wherein a rigid deflecting member 45 is fastened in the bottom of the stack 29 and has a second end 46 contacting the lower or butt end 47 of the second insulating tip 34. This thereby upwardly deflects the bimetallic strip 18 and consequently deflects the first flexible contact strip 16. The first contact 20 is thus deflectionally positioned at the position it would normally occupy at one limit of the given operating temperature range of the thermostat. In assembly of the thermostat, the rigid deflecting member 45 may be bent such as at the second end 46 to provide the proper amount of deflection to the bimetallic strip 18, or the butt end 47 of the second insulating tip 34 may be provided with the proper thickness to achieve the correct amount of deflection. The rigid deflecting member 45, therefore, serves the same purpose as the deflecting member 41 in the preferred embodiment of the invention.

Although I have used an electric iron as an example, it will also be obvious that my invention may be used for thermostat in refrigeration apparatus or the like, wherein the given operating temperature is lower than the normal temperature. The bimetallic element would then be fabricated in the thermostat so that the flexible bimetallic strip 18 deflected upwardly upon decreasing temperatures instead of increasing temperatures as has been used in the above description.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostat having a regulating range and a continuous "off" range, said thermostat comprising first and second contacts for making abutting engagement with each other, resilient means for supporting said first contact, adjustable means to constrainingly move said resilient means in a first direction for adjustably positioning said first contact through a distance including first, second and third positions, said first contact in said second position establishing a dividing temperature between the regulating range and the continuous "off" range, a supporting flexible member for supporting said second contact relative to said first contact, a bimetallic flexible member for constrainingly actuating said supporting flexible member and the second contact supported thereby in a direction opposite to said first direction, mechanical means for engaging and deflecting said bimetallic flexible member in said opposite direction and thereby restricting the travel of said second contact under the actuation of said bimetallic flexible member, said restricted travel of the second contact determining the regulating range and having as one of its limits the position where the second contact abuts said first contact when said first contact is in its second position and having as its other limit the position where the second contact abuts said first contact when said first contact is in its first position, said adjustable means providing the continuous "off" range upon moving said resilient means and the first contact supported thereby beyond said second position and toward the third position, said mechanical means comprising a deflecting strip having first and second parts, means for establishing said first part in intimate contact with at least a part of said bimetallic flexible member, and means for establishing said second part to deflect another part of said bimetallic flexible member.

2. A thermostat including a first rigid strip, a first flexible contact strip, a second flexible contact strip, an elastic bimetallic strip, a second rigid strip, each of said strips having first and second ends, stack means for rigidly clamping said first ends of each of said strips positioned in the order named and with said strips extending in substantially the same direction from the first to the second end thereof, insulating washers mounted in said stack means for insulating each said contact strip from the other strips, first and second contact points mounted, respectively, on said second ends of said first and second contact strips and adapted to electrically contact each other to pass current therebetween, a threaded nut fixedly mounted on said second end of said first rigid strip, a manually adjustable screw threadable in said nut and adapted to move the second end of said second flexible contact strip relative to said first flexible contact strip, insulating means between said manually adjustable screw and said second end of said second flexible contact strip, said bimetallic strip adapted to deflect in a given direction upon temperature variations in a given sense throughout a first and a second temperature range, an insulating tip mounted on said second end of said bimetallic strip and adapted to move said second end of said first contact strip as said bimetallic strip is deflected throughout said second temperature range, the first end of said second rigid strip lying against said first end of said bimetallic strip and with the second end of said second rigid strip deflecting the second end of said bimetallic strip thus to deflect said first contact strip from a first to a second position, said deflection of said first contact strip by said second rigid strip being in the same direction and of substantially the same degree of deflection as the deflection of said bimetallic strip during temperature variations in said given sense through said first temperature range.

EDWARD BLETZ.

REFERENCES CITED

The following references are of record in the file of this patent:

UNITED STATES PATENTS

| Number | Name | Date |
|---|---|---|
| 2,008,163 | Walder | July 16, 1935 |
| 2,190,276 | Smith | Feb. 13, 1940 |
| 2,267,387 | Winborne | Dec. 23, 1941 |
| 2,317,033 | Dafforn | Apr. 20, 1943 |